United States Patent [19]

Kolb

[11] 4,287,320

[45] Sep. 1, 1981

[54] COMPOSITION OF FLUOROELASTOMER AND DIORGANOSULFUROXIDE

[75] Inventor: Robert E. Kolb, Saint Paul, Minn.

[73] Assignee: Minnesota Mining and Manufacturing Company, Saint Paul, Minn.

[21] Appl. No.: 122,513

[22] Filed: Feb. 19, 1980

Related U.S. Application Data

[63] Continuation of Ser. No. 493,537, Aug. 1, 1974, abandoned, which is a continuation of Ser. No. 406,832, Oct. 16, 1973, abandoned.

[51] Int. Cl.³ .................... C08F 8/34; C08F 8/00
[52] U.S. Cl. .................... 525/340; 525/331; 525/348; 525/351; 525/353; 525/374; 525/377; 526/247
[58] Field of Search ............ 525/340, 343, 346, 352, 525/351, 353

[56] References Cited

U.S. PATENT DOCUMENTS

| | | | |
|---|---|---|---|
| 2,968,649 | 1/1961 | Pailthorp | 525/331 |
| 3,051,677 | 8/1962 | Rexford | 525/331 |
| 3,243,411 | 3/1966 | Tawney | 525/331 |
| 3,318,854 | 5/1967 | Honn | 525/331 |
| 3,400,065 | 9/1968 | Barth | 525/331 |
| 3,502,628 | 3/1970 | Barney | 525/331 |
| 3,655,727 | 4/1972 | Patel | 525/331 |
| 3,686,143 | 8/1972 | Bowman | 525/331 |
| 3,712,877 | 1/1973 | Patel | 525/331 |
| 3,752,787 | 8/1973 | de Brunner | 525/331 |
| 3,933,732 | 1/1976 | Schmiegel | 525/340 |

FOREIGN PATENT DOCUMENTS

| | | | |
|---|---|---|---|
| 2096115 | 1/1972 | France | 525/331 |
| 1344275 | 1/1974 | United Kingdom | 525/331 |
| 1356344 | 6/1974 | United Kingdom | 525/331 |

OTHER PUBLICATIONS

Roberts & Caserio, Basic Principles of Organic Chemistry, W. A. Benjamin Co., New York, N. Y., 1965, pp. 756-760.
Organic Synthesis, vol. I, pp. 718-725, vol. II, pp. 1709-1715, Reinhold Publ., New York, N. Y., 1957.
Kosolapoff, G. M., Organophosphorous Compounds, Wiley & Sons, New York, N. Y., 1950, Chapter 5.

*Primary Examiner*—C. A. Henderson
*Attorney, Agent, or Firm*—Cruzan Alexander; Donald M. Sell; William G. Ewert

[57] ABSTRACT

A diorgano sulfur oxide is included in a curable vinylidene fluoride elastomer formulation to provide desirable curing characteristics.

15 Claims, No Drawings

COMPOSITION OF FLUOROELASTOMER AND DIORGANOSULFUROXIDE

This is a continuation of application Ser. No. 493,537 filed Aug. 1, 1974, now abandoned, which in turn is a continuation of Ser. No. 406,832 filed Oct. 16, 1973, now abandoned.

This invention relates to a method for crosslinking fluorinated polymers and crosslinking compositions for use therein. In particular, this invention relates to compositions having improved processing characteristics and more particularly to compositions comprising adjuvant amounts of diorgano sulfur oxides which cure more readily than previously known compositions, without loss of valuable physical properties.

In general, linear polymers are thermoplastic in nature, and exhibit flow under the influence of heat and pressure. Such polymers can be resoftened as often as desired and are usually soluble in selected solvents. However, crosslinked or vulcanized polymers are generally thermoset, i.e., insoluble in most solvents and incapable of being resoftened without decomposition, because they become permanently hardened. A linear polymer may, nevertheless, contain a small number of crosslinkages without completely losing its thermoplastic properties. It is generally desirable to convert thermoplastic elastomers into crosslinked elastomers in order to decrease their solubility and thermoplastic flow properties and to obtain a harder and tougher product. The crosslinking of elastomers is commonly referred to as vulcanization.

Among the most difficultly vulcanizable thermoplastic polymers are those prepared by the polymerization of halogenated monoolefins, such as, for example, the copolymers of chlorotrifluoroethylene and vinylidene fluoride, the copolymers of perfluoropropene or pentafluoropropene and vinylidene fluoride and the terpolymers of perfluoropropene, vinylidene fluoride and tetrafluoroethylene. Many of these fluorinated thermoplastic polymers have unique and valuable properties. The polymers are crosslinked to retain these properties and at the same time decrease the thermoplastic flow and solubility.

In order to provide a molded, cured product from a fluoroelastomer such as those above, a complex procedure must be followed, each step of which influences both the properties and the cost of the final product. Initially, a uniform mixture of the desired formulation of gum stock and filler, curatives, processing aids, etc. must be prepared. Mixing can be done, for example, on a Banbury mixer or on a two roll mill, but, because of the toughness of the gum stock and the intensive mixing action, considerable internal heat is generated which must be controlled in order to avoid premature curing, which would effectively prevent proper forming or molding. The mixing operation is best carried out so that the temperature of the mass does not exceed 120° C. (250° F.) and preferably is maintained between 95° and 120° C. (200° and 250° F.) by appropriate cooling. The resultant formulated gum stock may then be set aside for whatever period of time may be desired, varying from hours to months, until the final forming operation is undertaken. This forming may be effected by extrusion, by molding using closed molds, or by any of the other common forming operations in the elastomer industry. In most cases the product is molded. In this operation the gum stock can be heated to the desired temperature, generally in the range of 150°–205° C. (300°–400° F.) and mechanically forced into the mold, which can be preheated to the approximate molding temperature. Alternatively, a weighed portion of the formulated gum stock can be placed in the cavity of the mold and the mold closed and heated. In either process, the stock must flow uniformly throughout the mold to fill all of the inner portion and must flow together and join integrally and uniformly at the interface of two or more flow streams. At the molding temperature initial curing takes place and must continue to a sufficient stage of cure so that the molded part will maintain its integrity without distortion or tearing when it is released and removed from the molds. The higher the mold temperature, the more rapidly such a "press cured" state can be attained. However, sufficient time must be allowed for the mold to be filled uniformly, and hence there is a practical maximum temperature. Ideally, the viscosity should not increase significantly during the initial flow which fills the mold but should then increase very rapidly to attain a sufficiently stable state for removal.

After removal from the mold, the part is customarily post cured or oven cured. If the cure has not advanced sufficiently during the molding step, the gases released during final cure may result in bubbling, blistering and distortion.

The utility of cured fluoroelastomers depends upon solvent resistance, good compression set characteristics, and resistance to degradation of properties at elevated temperatures. These properties, combined with the generally good elastomeric characteristics of fluoroelastomers, have resulted in the commercial use of a relatively narrow range of compositions in which the major molar component, commonly vinylidene fluoride, is combined with lesser molar amounts of one or more of perfluoropropylene, tetrafluoroethylene, trifluorochloroethylene or monohydroperfluoropropylene. A filler is generally required from any of a variety which have been suggested for use, although the filler usually selected is a medium reinforcing thermal carbon black.

Because the characteristics of the cured product are determined largely by the particular curing system used, most of the improvements in the characteristics of the final product have resulted from improved curing systems. The curing system dictates the conditions of mixing, forming and curing, which have a major influence on the cost of the final product as well as exerting its influence on the physical and chemical properties.

The polyamine curing systems that first enabled the achievement of satisfactory commercial products continue to be of importance. Long experience with polyamine systems has allowed safe handling and reliable processing, with the major difficulty being the tendency toward permanent deformation after extended use, that is, "compression set".

A curing system based on quaternary ammonium derivatives has been developed (U.S. Pat. No. 3,655,727) which has many of the desirable handling characteristics of the polyamine system, but produces a final product with much higher resistance to compression set. This curing system allows safe milling at 90°–120° C. (200°–250° L F.) and molding temperatures in the range of 160°–170° C. (320°–335° F.) with good flow and a short cure cycle. Cure is so rapid, in fact, at these temperatures that the stock tends to be "scorchy" and careful handling is required to avoid partial curing during the milling operation.

To a considerably extent these difficulties are overcome by use of quaternary phosphonium curing system based on the presence of a compound in which the phosphorus atom is covalently bonded to 4 carbon atoms and ionically bonded to an anion, as described in U.S. Pat. No. 3,712,877. The covalently-bonded radicals can be straight-chain, branched or cyclic organic radicals and can be saturated, unsaturated or aromatic. Generally 4 monovalent organic radicals are present, although the phosphorus atom can be part of a heterocyclic ring. Quaternary phosphonium compounds are generally used in conjunction with a nucleophilic organic compound in which one or more hydroxyl, primary amino or secondary amino radicals are bonded through the oxygen or nitrogen atoms to an aromatic nucleus. Conventional acid acceptors, modifiers, and fillers, particularly the carbon blacks, can be used. Such systems produce a compound which is safer than the quaternary ammonium systems, provide good mold flow and satisfactory cure times over a temperature range between about 150° C. (300° F.) and 230° C. (450° F.) and particularly from about 175°-190° C. (350°-370° F.). The characteristic viscosity versus time curves for such formulations show relatively slow buildup of viscosity up to a certain point and then a very rapid increase and thus allow safe mixing on mill or Banbury, extended storage, and economical curing at press conditions.

It is an object and aim of this invention to provide curable fluoroelastomer compositions having shortened time for press curing without adversely affecting the physical properties of the cured product.

Other objects will become evident from the disclosure herein.

In accordance with the above and other objects of the invention there is provided a curable elastomer composition comprising (1) an elastomeric copolymer of vinylidene fluoride and at least one terminally unsaturated fluoromonoolefin containing at least one fluorine atom substituent on each double-bonded carbon atom, each carbon atom of said fluoromonoolefin being substituted only with fluorine, chlorine, hydrogen or a lower fluoroalkyl or fluoroalkoxy radical, at least 10% of the chain carbon atoms of said copolymer being —CH$_2$— groups; (2) at least one quaternary phosphonium or ammonium compound; (3) at least one diorgano sulfur oxide. It is found that the use of diorgano sulfoxides and/or sulfones frequently allows reduction in amount of Ca(OH)$_2$ with both improved rate of cure and retention of desirable physical characteristics, including improved resistance to compression set, as compared to the presently known formulations. They may provide self-lubricating characteristics leading to relatively low pressure extrusions with excellent surface finish and provide moldings which are readily removed from the molds. Mold release agents may not be required with the instant compositions.

The vulcanizable polymers which are cured according to this invention are widely known linear, saturated, fluorinated polymers which can contain unreactive substituents selected from the group consisting of hydrogen, fluorine and chlorine and which are at least half halogenated. By "half halogenated" is meant that at least one half of the carbon bonded hydrogen atoms of the analogous non-halogenated polymer are replaced by halogen. The preferred vulcanizable polymers are at least half fluorinated; however, it is critical that the polymer chain include —CH$_2$— units. Homopolymers of tetrafluoroethylene and other perfluorinated comonomers require very high temperature to effect crosslinking and are not within the scope of this invention.

Linear fluorinated elastomers generally contain disordered, saturated, fluorinated carbon chains which include a substantial number of —CH$_2$— units, usually at least 10 percent of the chain carbon atoms. Disorder in the carbon chains is ordinarily achieved by the copolymerization of at least two monoolefinic compounds of the type hereinafter described. When one of the monoolefinic compounds contains an unsaturated chain of three or more carbon atoms, alkyl side groups, e.g. methyl, ethyl, etc. are present in the final polymer, and these alkyl groups are preferably perhalogenated, most preferably perfluorinated. Points of unbalance in the carbon chain, which are necessary for elastomeric properties, are provided by these side groups. Such side groups cause a bending of the linear carbon chain and thus provide additional degrees of freedom in space, producing an unsymmetrical chain carbon atom to which they are attached. However, unbalance is also provided by the presence of other unsymmetrical units in the linear carbon chain, such as —CFCl—. Irrespective of the units providing such points of unbalance, whether by two physically different substituent atoms or by a side group on a chain carbon atom, at least 10 percent of the chain carbon atoms should be unbalanced.

The linear, saturated, fluorinated carbon chain in the elastomers may also contain chlorine substituents, provided a single chain carbon atom has no more than one chlorine attached thereto to produce instability or to influence the chemical nature of the elastomer. The presence of more than one chlorine substituent on a single chain carbon atom produces a point of rigidity in the chain, decreasing the flexibility of the chain and the elastomeric properties accordingly.

Among the saturated polymers which may be crosslinked in accordance with this invention are the fluorinated elastomeric copolymers of chlorotrifluoroethylene, vinylidene fluoride, 2-chloroperfluoropropene, a fluorinated methyl vinyl ether, perfluoropropene, tetrafluoroethylene, 1-hydroperfluoropropene (i.e. CFH=CFCF$_3$), dichlorodifluoroethylene, trifluoroethylene, and 1,1-chlorofluoroethylene. These monoolefins may be copolymerized with each other in groups of two or more. They may also be copolymerized with other olefinic compounds such as ethylene. The preferred elastomers are copolymers of vinylidene fluoride with at least one terminally unsaturated fluoromonoolefin containing at least one fluorine atom substituent on each double bonded carbon atom, each carbon atom of said fluoromonoolefin being substituted only with fluorine, chlorine, hydrogen or a lower fluoroalkyl (e.g. perfluoroalkyl of 1-4 carbon atoms or fluoroalkoxy radical of 1-4 carbon atoms) particularly perfluoropropene, tetrafluoroethylene, chlorotrifluoroethylene and 1-hydroperfluoropropene. Particularly preferred are the fluorinated elastomers produced by the copolymerizing perfluoropropene and vinylidene fluoride, as described in U.S. Pat. Nos. 3,051,677 and 3,318,854, and those terpolymers produced by copolymerizing perfluoropropene, vinylidene fluoride and tetrafluoroethylene as described in U.S. Pat. No. 2,968,649. The elastomeric copolymers of perfluoropropene and vinylidene fluoride having between about 15 and about 50 mole percent perfluoropropene are outstanding in this respect. Mixtures of elastomers are also suitable, for example, a mixture of 70-95 parts of an elastomeric perfluoropropene-vinylidene fluoride copolymer with 30-5 parts of an elastomeric trifluorochloroethylene-vinylidene fluoride copolymer.

The adjuvant diorgano sulfur oxides employed in the present invention are compounds containing at least one sulfur atom, one or two oxygen atoms bonded only to each said sulfur, and, additionally, two neutral organic radicals which bond directly to the sulfur atoms by single C—S bonds. Such compounds include diorgano sulfoxides ($R_2SO_x$) and diorgano sulfones ($R_2SO_2$) wherein each R is an organic radical. The structures are combined in $R_2SO_x$ wherein x is 1 or 2. Such materials are described, for example, in Basic Principles of Organic Chemistry, Roberts and Coserio, W. A. Benjamin Company, New York, N.Y., 1965, particularly pages 756-760, Organic Syntheses, Vol. 1, pages 718-725, Vol. II, pages 1709-1715, Reinhold Publishing Co., New York, N.Y. 1957.

The organic radicals (R) may be the same or different and each radical may contain from one to twenty or more carbon atoms, although one to about eight carbon atoms are preferred, with a total of not more than about thirty carbon atoms associated with each sulfur atom. The two R groups together may be a single alkylene group, forming a heterocyclic ring. The carbon skeletal chain of the R groups may be linear, branched, or cyclic and may be aliphatic or aromatic and may contain catenary hetero atoms, such as oxygen, in addition to carbon. The chain may be substituted or unsubstituted, but the substituents, if any, should preferably be neutral, i.e. neither strongly acidic nor basic radicals (such as radicals derived from acids or bases having ionization constants $K_A$ and $K_B$ in water at 25° C. of at least $10^{-5}$) or salts thereof (e.g. carboxyl, sulfonic, or phosphorus acid or salts thereof or amines, hydrazines or salts therof), although active hydrogen in a weakly acidic form, such as aliphatic hydroxyl radical, is acceptable in small amounts, e.g. 0.5% by weight or less of the compound. Neutral substituents include but are not limited to halogen, ether, $O_xSR$—, ester, oxo, hydroxyl, nitro, CN, alkyl, aryl.

Representative diorgano sulfur oxides include:

| | |
|---|---|
| $(CH_3)_2SO$ | $(CH_3)_2SO_2$ |
| $(C_4H_9)_2SO$ | $(C_4H_9)_2SO_2$ |
| $CH_3(C_8F_{17})SO$ | $CH_3(C_8F_{17})_2SO_2$ |

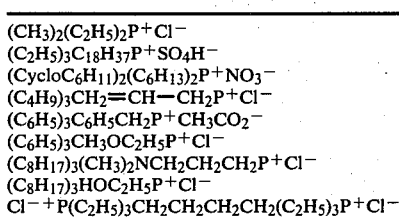

$(ClC_6H_4)_2SO$      $(ClC_6H_4)_2SO_2$
$(C_2H_5OC_2H_4)_2SO$      $(C_2H_5OC_2H_4)_2SO_2$
$(CH_3-CH_2-CH_2)_2SO$
$C_2H_5SO_2C_2H_4OC_2H_5$
$C_2H_5SOC_4H_8SOC_2H_5$
$C_2H_5SOC_4H_8SOC_2H_5$
$(CH_3-CH_2-CH_2)_2SO_2$
$C_6H_5SOCH_2C_6H_5$
$C_6H_5SO_2CH_2C_6H_5$
$C_2H_5SO_2C_4H_8SO_2C_2H_5$
$C_2H_5SO_2CH_2CH_2OCOCH_3$
$CHClCH_2CH_2CH_2SO_2C_6H_5$
$CH_3C_6H_4SO_2CH_2CH_2CH_2CH_2CN$
$C_4H_9SO_2C_4H_8NO_2$
$CH_3COCH_2CH_2SO_2C_4H_9$
$C_3F_7CH_2SO_2CH_2C_3F_7$

The quaternary phosphonium compounds useful in preparing curable fluoroelastomer compositions are compounds which contain at least one phosphorus atom covalently bonded through carbon-phosphorus single bonds to four organic radicals and, additionally, through an ionic bond to an anion. Such materials, their characteristics and several methods of preparation are described, for example in "Organophosphorus Compounds", G. M. Kosolapoff, (John Wiley and Sons, New York 1950), particularly chapter five. The four organic radicals bonded to each phosphorus atom may be the same or different, and each radical may contain from one to twenty or more carbon atoms, although two to about eight carbon atoms are preferred with a total of not more than about thirty. The carbon skeletal chain of the organic radical may be linear, branched, or cyclic and may be saturated, unsaturated, or aromatic and may contain atoms other than carbon, such as oxygen, nitrogen or sulfur in addition to carbon. The chain may be substituted or unsubstituted, but the substituents, if any, should preferably not be strongly acidic radicals (i.e. radicals derived from an acid having an ionization constant in water at 25° C. of at least $10^{-5}$) or a salt thereof (e.g. carboxyl, sulfonic, or phosphonic acid or salts thereof) although active hydrogen in a weakly acidic form, such as an aliphatic hydroxyl radical is acceptable in small amounts, e.g. 0.5% by weight or less of the compound.

Representative quaternary phosphonium compounds include:

$(CH_3)_2(C_2H_5)_2P^+Cl^-$
$(C_2H_5)_3C_{18}H_{37}P^+SO_4H^-$
$(CycloC_6H_{11})_2(C_6H_{13})_2P^+NO_3^-$
$(C_4H_9)_3CH_2=CH-CH_2P^+Cl^-$
$(C_6H_5)_3C_6H_5CH_2P^+CH_3CO_2^-$
$(C_6H_5)_3CH_3OC_2H_5P^+Cl^-$
$(C_8H_{17})_3(CH_3)_2NCH_2CH_2P^+Cl^-$
$(C_8H_{17})_3HOC_2H_5P^+Cl^-$
$Cl^-+P(C_2H_5)_3CH_2CH_2CH_2CH_2(C_2H_5)_3P^+Cl^-$

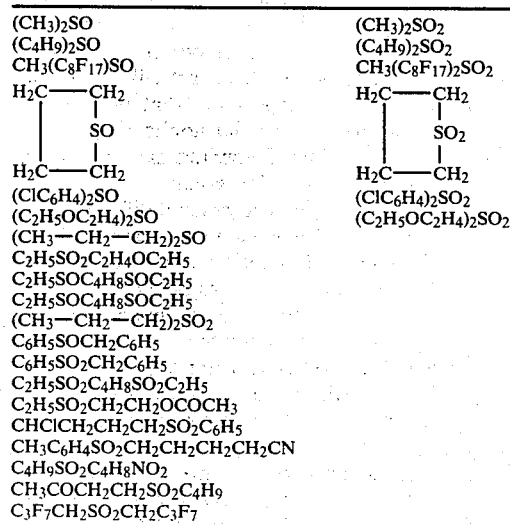

(i.e. tetrabutyl phosphonium captate)

Quaternary ammonium compounds useful in preparing curable fluoroelastomer compositions are compounds which contain at least one nitrogen atom covalently bonded through carbon-nitrogen single bonds to four organic radicals and additionally through an ionic bond to an anion. Such materials are described, for example, in U.S. Pat. No. 3,655,727, column 4, line 65 to column 5, line 2, and U.S. Pat. No. 3,752,787, at column 6, lines 1 through 22. The four organic radicals bonded to each nitrogen atom may be the same or different, and each radical may contain from one to twenty or more carbon atoms, although 2 to about 8 carbon atoms are preferred, with a total of not more than about 30. The carbon skeletal chain of the organic radical may be linear, branched or cyclic and may be saturated or unsaturated; compositions in which the nitrogen atom is bonded to one or more aromatic rings are relatively low in curing reactivity, and are generally less preferred. The radical may contain catenary oxygen, nitrogen, or sulfur atoms in addition to carbon atoms. The chain may be substituted or unsubstituted, but substituents, if any, should preferably not be strongly acidic radicals (i.e. radical derived from an acid having an ionization constant in water at 25° C. of at least $10^{-5}$) or a salt thereof (e.g. carboxyl, sulfonic, or phosphonic acid or salts thereof). Although active hydrogen in a weak acidic form, such as an aliphatic hydroxyl radical is acceptable in small amounts, e.g. 0.5% by weight or less of the compound.

Representative quaternary ammonium compounds include:

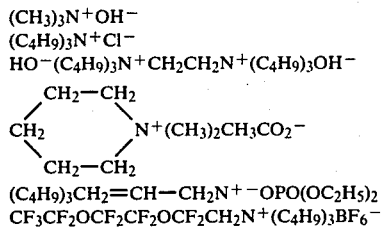

$(CH_3)_3N^+OH^-$
$(C_4H_9)_3N^+Cl^-$
$HO^-(C_4H_9)_3N^+CH_2CH_2N^+(C_4H_9)_3OH^-$ $(C_4H_9)_3CH_2=CH-CH_2N^+-OPO(OC_2H_5)_2$
$CF_3CF_2OCF_2CF_2OCF_2CH_2N^+(C_4H_9)_3BF_6^-$

Quaternary phosphonium and ammonium compounds having too high a molecular weight diffuse less efficiently through the fluorocarbon polymer during the curing process, thus tending to result in some unevenness in cure and less preferred physical properties in the resulting vulcanizate. A generally satisfactory cure can be obtained most effectively with a compound having a molecular weight of not more than about 1,000 and in most cases a molecular weight of not more than about 500 is preferred. The nature of the anion is not critical and is generally determined by the nature of the reactants used in synthesizing the phosphonium compound. The anion is generally monovalent, but it may also be divalent or polyvalent. Typical anions are chloride, bromide, hydroxyl, methoxy, acetate, mercaptate, sulfate, bisulfate and the like. Neutral salts are preferred over acidic or basic phosphonium or ammonium compounds because of their better stability and easier handling, although it should be recognized that the compounds may be converted to the basic form during compounding, since the vulcanizable composition contains large amounts of relatively strong base, such as magnesium oxide or calcium hydroxide.

In addition to the quaternary phosphonium or ammonium compounds, it is usually desirable to use co-curatives. Such co-curatives are well known and are described in the literature, for example in U.S. Pat. Nos. 3,243,411 and 3,502,628. A particularly preferred class described in U.S. Pat. No. 3,655,727 comprises the aromatic hydroxy or amino compounds, that is, nucleophilic compounds in which one or more hydroxyl, primary amino, or secondary amino radicals are bonded through the oxygen or nitrogen atom of the radical to an aromatic nucleus, such as phenyl, naphthyl, and the like. Co-curatives containing two aromatic hydroxyl groups are more particularly preferred. Such co-curatives are described and exemplified, for example in U.S. Pat. No. 3,752,787, as at Col. 3, line 33 to Col. 4, line 35 as di-, tri-, and tetrahydroxybenzenes, naphthalenes, and

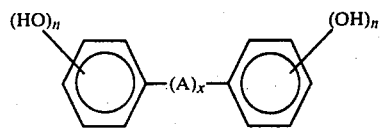

wherein A is a difunctional aliphatic, cycloaliphatic, or aromatic radical of 1–13 carbon atoms, or a thio, oxy, carbonyl, sulfinyl, or sulfonyl radical; A is optionally substituted with at least one chlorine or fluorine atom; x is 0 or 1; n is 1 or 2; and any aromatic ring of the polyhydroxylic compound is optionally substituted with at least one atom of chlorine, fluorine, or bromine. It will be understood from the above bisphenol formula that the —OH groups can be attached in any position (other than number one) in either ring. Blends of two or more such compounds can also be used. One of the most useful compounds is the bisphenol known as Bisphenol AF, which is hexafluoroisopropylidene-bis(4-hydroxybenzene). The compounds 4,4'-dihydroxydiphenyl sulfone (Bisphenol S) and isopropylidenebis(4-hydroxybenzene) or Bisphenol A are also considered as very useful bisphenols. Another very useful compound is hydroquinone. Others are illustrated by such dihydroxybenzenes as catechol, resorcinol, 2-methyl resorcinol, 5-methyl resorcinol, 2-methyl hydroquinone, 2,5-dimethyl hydroquinone, and 2-t-butyl hydroquinone; also included are such compounds as 1,5-dihydroxynaphthalene and 9,10-dihydroxyanthracene. Others are illustrated as follows:

1,4,9,10-tetrahydroxyanthracene;
2,2',4,4'-tetrahydroxybenzophenone;
2,4-dihydroxybenzophenone;
2,4-dihydroxybenzoic acid;
4,4'-dihydroxytetraphenylmethane;
2,6-dihydroxyanthraquinone;
3,6-dihydroxyxanthone;
pyromellitic-bis-(p-hydroxyphenylimide);
2,4-dihydroxyacetophenone;
4,4'-dihydroxybenzophenone;
4,4'-dihydroxydiphenyl sulfoxide;
2,4-dibenzoyl resorcinol;
2,4,5-trihydroxbutyrophenone;
2,4-dihydroxbenzaldehyde.

When changing from one co-curative to another in a given composition, one skilled in the art will be able to select a curing time and temperature that will give a suitable rate of cure for a particular application.

Referring to the bisphenol formula shown above, when A is alkylene, it can be for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, pentachloropentamethylene, pentafluoropentamethylene and hexamethylene. When A is alkylidene, it can be, for example, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, and 1,1-cyclohexylene. When A is a cycloalkylene radical, it can be for example, 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, and cycloheptylene. Furthermore, A can be an arylene radical such as m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthalene, 3-fluoro-1,4-naphthalene, 5-chloro-1,4-naphthalene, 1,5-naphthalene, and 2,6-naphthalene.

A further component which is contained in the final curing recipe is an acid acceptor, preferably an inorganic acid acceptor. Suitable acid acceptors are bases and include magnesium oxide, lead oxide (litharge, PbO), dibasic lead phosphite and zinc oxide, with magnesium oxide being preferred. The acid acceptors are used in amounts ranging from 2 to 25 parts per 100 parts of polymer. In addition an "optical base" is often desired as a cure accelerator. These optional bases are basic compounds and include inorganic oxides and hydroxides such as calcium hydroxide, barium carbonate, strontium hydroxide, and the like. The optional bases are preferably used in amounts ranging from 0.5 to 10 parts per 100 parts of polymer.

Dimethyl sulfoxide is a typical diorgano sulfur oxide and those with skill in the art will readily perceive numerous variations which are possible within the scope of the present invention. Thus, one may use diethyl sulfone, methyl benzyl sulfone, phenyl ethyl sulfoxide, methyl octyl sulfone and other such sulfoxides and sulfones as may be conveniently available without departing from the scope of the invention as will become evident from the disclosure herewith.

The proportions of components for a typical curing system are set forth below in parts by weight. All amounts referred to herein are in parts per 100 parts of polymer, unless otherwise indicated, which is abbreviated "pphr" or alternatively "parts phr". These proportions are general ranges and the particular amount for each particular cure, time and temperature will become apparent to those skilled in the art.

| Formulation Limits | |
|---|---|
| Component | Parts phr (range) |
| Quaternary compound | 0.1–5 |
| Diorgano sulfur oxide | 0.2–5 |
| Acid acceptor | 0–25 |
| | } together 3–40 |
| Optional base | 0–25 |
| Aromatic hydroxy or amino compound | 0.2–5 |

Although useful elastomers are obtained within the aforementioned formulation limits, elastomeric products having particularly desirable compression set values may be obtained by varying the relative amounts of the components within the specified ranges.

Of the acid acceptors, magnesium oxide is preferred. At least about 2 pphr is required to provide a reasonable level of cure and rate of cure. While a satisfactorily curable composition can be obtained using only, for example, three parts of an optional base such as calcium hydroxide, it is generally preferred to use at least one part of acid acceptor such as magnesium oxide, along with the optical base to obtain improved resistance to heat aging. The maximum amount for the acid acceptor as listed above is not critical, as much as 50 to 60 pphr producing a usable but hard stock. Generally, however, no more than about 25 parts is necessary for adequate curing. Alternatively, zinc oxide, litharge or dibasic lead phosphite may be used in approximately the same proportions, and calcium oxide may sometimes be used.

In addition to the above acid acceptors, when an optional base is desired as an accelerator, it is usually present in amounts of from about 0.5 to 15 pphr. Calcium hydroxide is preferred, barium carbonate being milder and generally being used in somewhat larger amounts. At least about three parts of combined acid acceptor and optional base is generally used, for satisfactory curing. Use of eight parts or more minimizes shrinkage during milling and preforming operations.

Fillers are often added to the polymers discussed above to improve the molding characteristics and other properties. When a filler is employed it is added to the vulcanization recipe in amounts of up to about 100 parts pphr, preferably between about 15 and about 50 parts. Examples of fillers which may be used are reinforcing thermal grade carbon blacks or non-black pigments of relatively low reinforcement characteristics such as clay, barytes, silica, silicates, etc. Plasticizers, softeners and processing aids, preferably esters or ketones, may also be added if desired.

In accordance with this invention, the desired amount of the components of the crosslinking system is added to the unvulcanized fluorocarbon polymer (i.e., gum stock) and is intimately admixed therewith or compounded by employing any of the usual rubber mixing devices, such as Banbury mixers, roll mills, or any other convenient mixing device. It has been found that a Banbury is particularly suitable for large batches because it is more economical of time than milling. The diorgano sulfur oxides of the present invention allow adequate stability under mixing conditions even in the case of systems capable of very rapid press cure, e.g. 1 minute at 375° F. (190° C.).

The curing process typically comprises pressing the compounded mixture in or injecting the mixture into a mold and then, after demolding, i.e., removing from the mold, baking the demolded pressing in an oven. Pressing of the compounded mixture (press cure) is conducted at a temperature between about 95° C. (200° F.) and about 230° C. (450° F.) preferably between about 150° and 205° C. (300° and 400° F.) for a period of 30 seconds or less to about 15 hours, usually from 1 minute to about 30 minutes. A pressure of between about 7 and about 210 kg/cm$^2$, preferably between about 35 and about 70 kg/cm$^2$, is imposed on the compounded mixture in the mold. The molds may be first coated with release agents, such as a silicone oil, and prebaked. The molded vulcanizate is then usually post cured (oven cured) at a temperature between about 150° and 315° C. (300° and 600° F.) usually at about 205° C. (400° F.) for a period of from 2 hours or less to 50 hours depending on the cross-sectional thickness of the sample. The temperature during the post cure is usually raised gradually from the lower limit of the range to the desired maximum temperature selected. Maximum temperature used is generally about 260° C. (500° F.) and may be held at this value for 24 hours or even longer.

A number of runs are made for comparison purposes (particularly runs 1–8) and to demonstrate the processes and compositions of the invention. The compositions used and the pertinent characteristics of curing and of the cured polymer are set forth in Tables 1 through 4. Tables 1 and 3 show compositions of runs 1–8 and 9–18 respectively and the properties are set forth in Tables 2 and 4. In each run 100 parts of a copolymer of vinylidene fluoride and perfluoropropene in molar proportions of 78:22 is used together with 30 parts phr of carbon black. As one point of comparison, material of run 9 (Control run) require 3 minutes press cure in commercial equipment whereas runs 10 through 14 (runs according to the invention) require 1 minute. Run 16 also requires 3 minutes but the reduction in amount of phosphonium chloride results in improved properties. Compounding is performed in a roll mill and curing is effected as described above.

Curing characteristics are measured in accordance with ASTM D 2084-71T, using an oscillator frequency of 100 cpm, and a 3° arc. Minimum torque and "time to one pound rise" are measures of the rate of initial cure, a measure of the resistance of the formulation to scorch. The torque at 12 minutes and time to 50 pound rise indicate the rate of cure and the capability of the material to be adequately cured prior to demolding. Sheets are prepared, 75 by 150 by 1.8 mm. pressed at about 70 kg per square centimeter for 20 minutes at 160° C. Physical properties are measured on samples diecut from these sheets in accordance with ASTM D 412-62T, die C.

Compression set is determined in accordance with ASTM D 395-61B using 25 mm. diameter O-rings, 3.4 mm. thick, compressed to 2.7 mm. under the indicated conditions.

TABLE 1

| Run | 1 | 2 | 3 | 4 | 5 | 6 | 7 | 8 |
|---|---|---|---|---|---|---|---|---|
| Copolymer | 100 | 100 | 100 | 100 | 100 | 100 | 100 | 100 |
| Carbon black | 30 | 30 | 30 | 30 | 30 | 30 | 30 | 30 |
| MgO | 3 | 3 | 3 | 3 | 3 | 3 | 3 | 3 |
| Ca(OH)$_2$ | 6 | 6 | 6 | 6 | 6 | 6 | 6 | 6 |
| 2,2 bis(p-OH-phenyl)hexafluoropropane | 2 | 2 | — | — | — | — | 2 | 2 |
| 1,4 dihydroxy benzene | — | — | 1 | 1 | 1 | 1 | — | — |
| Tetrabutyl ammonium Captax | 0.4 | 0.4 | 0.4 | 0.4 | — | — | — | — |
| Triphenyl benzyl phosphonium chloride | — | — | — | — | 0.6 | 0.6 | — | — |
| Tributyl allyl phosphonium chloride | — | — | — | — | — | — | 0.4 | 0.4 |
| Tetramethylene sulfone | — | 1 | — | 1 | — | 1 | — | 1 |

TABLE 2

| Run | 1 | 2 | 3 | 4 | 5 | 6 | 7 | 8 |
|---|---|---|---|---|---|---|---|---|
| Rheometer 175° C., 3° arc 100 cpm | | | | | | | | |
| Torque, minimum (lbf. in.) | 9.0 | 9.0 | 13.5 | 13.5 | 13.8 | 13.8 | 10.5 | 13.0 |
| Torque, 12 minutes (lbf. in.) | 107 | 106 | 112 | 111 | 92 | 93 | 105 | 104 |
| Time to 1 lb. rise (min.) | 4.7 | 3.9 | 2.8 | 2.4 | 2.8 | 2.6 | 4.0 | 2.9 |
| Time to 50 lb. rise (min.) | 6.9 | 5.7 | 4.2 | 3.6 | 4.6 | 4.1 | 5.7 | 4.2 |
| Postcured (22 hrs. at 260° C.) | | | | | | | | |
| Tensile (kg/cm$^2$) | 136 | 133 | 102 | 115 | 112 | 116 | 136 | 131 |
| Modulus (kg/cm$^2$) | 78 | 74 | 85 | 93 | 59 | 61 | 68 | 72 |
| Elongation at break (%) | 175 | 175 | 125 | 120 | 165 | 175 | 190 | 180 |
| Hardness (Shore A$_2$) | 76 | 77 | 76 | 78 | 76 | 78 | 78 | 80 |
| Compression set (72 hrs. at 200° C.) (%) | 26 | 27 | 23 | 34 | 25 | 25 | 21 | 22 |

TABLE 3

| Run | 9 | 10 | 11 | 12 | 13 | 14 | 15 | 16 |
|---|---|---|---|---|---|---|---|---|
| Copolymer | 100 | 100 | 100 | 100 | 100 | 100 | 100 | 100 |
| Carbon black | 30 | 30 | 30 | 30 | 30 | 30 | 30 | 30 |
| MgO | 3 | 3 | 3 | 3 | 3 | 3 | 3 | 3 |
| Ca(OH)$_2$ | 6 | 6 | 6 | 6 | 6 | 6 | 6 | 6 |
| 2,2,bis(p-OH-phenyl)hexafluoropropane | 2 | 2 | 2 | 2 | 2 | 2 | 2 | 2.4 |
| triphenyl benzyl phosphonium chloride | 0.6 | 0.6 | 0.6 | 0.6 | 0.6 | 0.6 | 0.6 | 0.4 |
| tetramethylene sulfone | — | 1 | — | — | — | — | — | 1 |
| tetramethylene sulfoxide | — | — | 1 | — | — | — | — | — |
| Dimethyl sulfone | — | — | — | 1 | — | — | — | — |
| Dimethylsulfoxide | — | — | — | — | 0.5 | 0.25 | — | — |
| Bis(p-chlorophenyl)sulfone | — | — | — | — | — | — | 1 | — |

TABLE 4

| Run | 9 | 10 | 11 | 12 | 13 | 14 | 15 | 16 |
|---|---|---|---|---|---|---|---|---|
| Rheometer 177° C. 3° arc 100 cpm | | | | | | | | |
| torque, minimum (lbf. in.) | 7.5 | 8.0 | 14.0 | 10.5 | 12.5 | 11.5 | 7.0 | 7.5 |
| torque, 12 minutes (lbf. in.) | 106 | 103 | 84 | 99 | 94 | 96 | 99 | 105 |
| time to 1 lb. rise (min.) | 5.0 | 3.9 | 2.5 | 3.1 | 2.7 | 3.2 | 4.4 | 4.8 |
| time to 50 lb. rise (min.) | 7.4 | 5.0 | 4.1 | 4.5 | 4.5 | 4.9 | 6.8 | 7.2 |
| Post cured (22 hrs. at 260° C.) | | | | | | | | |
| Tensile (kg/cm$^2$) | 151 | 148 | 152 | 132 | | 156 | 151 | 160 |
| Modulus (kg/cm$^2$) | 76 | 63 | 61 | 63 | | 64 | 58 | 72 |
| Elongation at break (%) | 180 | 185 | 215 | 185 | | 220 | 200 | 185 |
| Compression set (72 hrs. at 200° C.) (%) | 17.5 | 17.3 | 21.2 | 20.5 | | 20.0 | 17.0 | 15.9 |

What is claimed is:

1. A curable fluoroelastomer composition consisting essentially of elastomeric co-polymer of vinylidene fluoride and terminally ethylenically unsaturated fluorinated comonomer, and for each hundred parts of said co-polymer:

a. 0.2 to 5 parts diorganosulfur oxide, which contains two like or unlike aliphatic, cycloaliphatic or aromatic groups which are unsubstituted or substituted only with halogen;
b. 0.1 to 5 parts quaternary phosphonium or ammonium compound;
c. a total of 3 to 40 parts consisting of 0 to 25 parts acid acceptor, and 0 to 25 parts optional base; and
d. 0.2 to 5 parts aromatic hydroxy or amino compound.

2. A curable fluoroelastomer composition according to claim 1 wherein the elastomeric copolymer comprises vinylidene fluoride and perfluoropropene.

3. A curable fluoroelastomer composition according to claim 1 wherein the diorganosulfur oxide is a diorganosulfoxide.

4. A curable fluoroelastomer composition according to claim 1 wherein the diorganosulfur oxide is diorganosulfone.

5. A curable fluoroelastomer composition according to claim 1 wherein the acid acceptor is magnesium oxide and the optional base is calcium hydroxide.

6. A curable fluoroelastomer composition according to claim 1 wherein the aromatic hydroxy compound is 2,2-bis-(p-hydroxyphenyl)hexafluoropropane.

7. A curable fluoroelastomer composition according to claim 1 wherein the diorganosulfur oxide is tetramethylene sulfone.

8. A curable fluoroelastomer composition according to claim 1 wherein the diorganosulfur oxide is tetramethylene sulfoxide.

9. A curable fluoroelastomer composition according to claim 1 wherein the diorganosulfur oxide is dimethylsulfone.

10. A curable fluoroelastomer composition according to claim 1 wherein the diorganosulfur oxide is dimethylsulfoxide.

11. A curable fluoroelastomer composition according to claim 1 wherein the diorganosulfur oxide is bis(p-chlorophenyl)sulfone.

12. A curable fluoroelastomer composition consisting essentially of elastomeric co-polymer of vinylidene fluoride and terminally ethylenically unsaturated fluorinated comonomer, and for each hundred parts of said copolymer:
   a. 0.2 to 5 parts diorganosulfur oxide, which contains two like or unlike aliphatic, cycloaliphatic or aromatic groups which are unsubstituted or can be substituted only with halogen, aliphatic hydroxyl, nitro, and cyano substituents;
   b. 0.1 to 5 parts quaternary phosphonium or ammonium compound;
   c. a total of 3 to 40 parts consisting of 0 to 25 parts acid acceptor, and 0 to 25 parts optional base; and
   d. 0.2 to 5 parts aromatic hydroxy or amino compound.

13. A curable fluoroelastomer composition consisting essentially of elastomeric co-polymer of vinylidene and perfluoropropene, or co-polymer of vinylidene fluoride, perfluoropropene, and tetrafluoroethylene, and for each 100 parts of said copolymer:
   (a) 0.2 to 5 parts bis(p-chlorophenyl)sulfone;
   (b) 0.1 to 5 parts triphenyl benzyl phosphonium chloride;
   (c) a total of 3 to 40 parts consisting of 0 to 25 parts magnesium oxide, and 0 to 25 parts calcium hydroxide; and
   (d) 0.2 to 5 parts 2,2-bis(p-hydroxyphenyl)hexafluoropropane.

14. A curable fluoroelastomer composition comprising an elastomeric copolymer of vinylidene fluoride and at least one terminally unsaturated fluoromonoolefin containing at least one fluorine atom substituent on each double-bonded carbon atom, each carbon atom of said fluoromonoolefin being substituted only with fluorine, chlorine, hydrogen or a lower fluoroalkyl or fluoroalkoxy radical, at least 10% of the chain carbon atoms of said copolymer being —CH$_2$— groups, and for each 100 parts of said copolymer:
   a. 0.2 to 5 parts diorganosulfur oxide, which contains two like or unlike aliphatic, cycloaliphatic or aromatic groups which are unsubstituted or substituted only with halogen;
   b. 0.1 to 5 parts quaternary phosphonium or ammonium compound;
   c. a total of 3 to 40 parts consisting of 0 to 25 parts acid acceptor, and 0 to 25 parts optional base; and
   d. 0.2 to 5 parts aromatic hydroxy or amino compound.

15. A curable fluoroelastomer composition comprising an elastomeric copolymer of vinylidene fluoride and at least one terminally unsaturated fluoromonoolefin containing at least one fluorine atom substituent on each double-bonded carbon atom, each carbon atom of said fluoromonoolefin being substituted only with fluorine, chlorine, hydrogen or a lower fluoroalkyl or fluoroalkoxy radical, at least 10% of the chain carbon atoms of said copolymer being —CH$_2$— groups, and for each 100 parts of said copolymer:
   a. 0.2 to 5 parts diorganosulfur oxide, which contains two like or unlike aliphatic, cycloaliphatic or aromatic groups which are unsubstituted or can be substituted only with halogen, aliphatic hydroxyl, nitro, and cyano substituents;
   b. 0.1 to 5 parts quaternary phosphonium or ammonium compound;
   a total of 3 to 40 parts consisting of 0 to 25 parts acid acceptor, and 0 to 25 parts optional base; and
   d. 0.2 to 5 parts aromatic hydroxy or amino compound.

* * * * *